| (12) | United States Patent | (10) Patent No.: | US 9,897,415 B2 |
|---|---|---|---|
| | Zhang et al. | (45) Date of Patent: | Feb. 20, 2018 |

(54) INFRARED-LIGHT AND LOW-LIGHT TWO-PHASE FUSION NIGHT-VISION SIGHTING DEVICE

(71) Applicant: Huntercraft Limited, Albany, NY (US)

(72) Inventors: Lin Zhang, Albany, NY (US); Chunhua Shi, Albany, NY (US); Sang Su, Albany, NY (US)

(73) Assignee: HUNTERCRAFT LIMITED, Albany, NY (US)

( * ) Notice: Subject to any disclaimer, the term of this patent is extended or adjusted under 35 U.S.C. 154(b) by 6 days.

(21) Appl. No.: 14/978,446

(22) Filed: Dec. 22, 2015

(65) Prior Publication Data

US 2017/0176139 A1      Jun. 22, 2017

(51) Int. Cl.
| F41G 1/32 | (2006.01) |
| G02B 27/10 | (2006.01) |
| G02B 27/32 | (2006.01) |
| F41G 1/38 | (2006.01) |
| F41G 3/08 | (2006.01) |
| F41G 3/06 | (2006.01) |
| G06T 5/00 | (2006.01) |
| G06T 3/00 | (2006.01) |

(52) U.S. Cl.
CPC ............... *F41G 1/32* (2013.01); *F41G 1/38* (2013.01); *F41G 3/06* (2013.01); *F41G 3/08* (2013.01); *G02B 27/1006* (2013.01); *G02B 27/32* (2013.01); *G06T 3/0068* (2013.01); *G06T 5/002* (2013.01); *G06T 2207/10048* (2013.01); *G06T 2207/20182* (2013.01); *G06T 2207/20221* (2013.01)

(58) Field of Classification Search
CPC ... F41G 1/32; F41G 1/36; G02B 26/06; G01J 5/28; G01J 2005/283; G01J 2005/286
See application file for complete search history.

(56) References Cited

U.S. PATENT DOCUMENTS

| 7,842,921 B2* | 11/2010 | Reed ...................... G02B 23/12 |
| | | 250/330 |
| 2006/0164718 A1* | 7/2006 | Tai ......................... G02B 23/12 |
| | | 359/353 |
| 2011/0272580 A1* | 11/2011 | Houde-Walter .......... F41G 1/35 |
| | | 250/338.3 |

\* cited by examiner

*Primary Examiner* — Stephen Johnson

(74) *Attorney, Agent, or Firm* — Novick, Kim & Lee, PLLC; Allen Xue

(57) ABSTRACT

The present invention relates to the technical field of sighting device, and specifically relates to an infrared-light and low-light two-phase fusion night-vision sighting device. The night-vision sighting device comprises a field-of-view obtaining unit, a two-phase fusion unit, a control unit and a display unit, the two-phase fusion unit in the night-vision sighting device can perform infrared-light and low-light fusion processing to the optical image obtained by the field-of-view obtaining unit, and display on the display unit, which realizes to obtain a night-vision image featured by image stabilization, clear outline, high resolution, high contrast, high SNR, and low pepper and salt noise, to thereby ensure night-vision sighting of the electronic gun sight under the condition of night or low brightness.

23 Claims, 10 Drawing Sheets

INFRARED-LIGHT AND LOW-LIGHT TWO-PHASE FUSION NIGHT-VISION SIGHTING DEVICE

TECHNICAL FIELD

The present invention relates to the technical field of gun sight, and more specifically relates to an infrared-light and low-light two-phase fusion night-vision sighting device.

BACKGROUND

Traditional sights usually include mechanical sights and optical sights, wherein the mechanical sights generally refer to performing sighting mechanically through a metallic sight such as a rear sight, a front sight, and a notch; The optical sighting device utilizes optical lens to image, to make a target image and a line of sight superimposed on the same focal plane, thus, sighting is realized.

In the prior art, in order to improve shooting accuracy, and adapt more shooting environments, more techniques are integrated on the electronic sighting device. For example, when a user performs hunting or shooting at night, a night-vision function can be applied on sighting device, then the sighting device can help users more accurately search for a targeted object, which facilitates shooting. The sighting device with night-vision function in the prior art mostly applies at least one objective lens, light enhancement means and eye lens, the objective lens forms an image of external scenery on an entrance window of the enhancement means, the light enhancement means enhances the brightness, and the image after light level enhancement is displayed, to improve night-vision ability. However, when the above night-vision device is applied, the brightness of the image displayed on a display screen progressively increases from the background to the sighted object, resulting in that distinction between the targeted object image boundary brightness and background brightness is not obvious, and the boundary of the targeted object is blurred, thus, the obtained night-vision image has blurred boundary, which makes the shooter only obtain the location and orientation of the targeted object, and it is difficult to determine an optimum sighting point, therefore, it requires the user to judge the sighting point by virtue of shooting experience, which increases shooting difficult, and also causes instability of shooting accuracy.

SUMMARY OF THE INVENTION

In order to solve the above problems, the present invention provides a night-vision sighting device featured by quick fusion of night-vision image processing, stable displaying, clear night-vision image boundary, simple shooting calibration, quick and accurate sighting, enabled man-machine interaction, and enabled dual-eye sighting.

The invention provides an infrared-light and low-light two-phase fusion night-vision sighting device, the night-vision sighting device comprising a housing that defines an accommodation space, the accommodation space includes a field-of-view obtaining unit, a two-phase fusion unit, a control unit, and a display unit, the two-phase fusion unit in the night-vision sighting device can convert the optical image obtained by the field-of-view obtaining unit into infrared digital image and low-light digital image, and transmit to the control unit, the infrared digital image and the low-light digital image is fusion-processed via the control unit, and displayed on the display unit, which facilitates user for sighting under low-brightness environment.

Further, the two-phase fusion unit comprises a light-splitting means, the light-splitting means splits the image obtained by the field-of-view obtaining unit into two beams of light paths, the two beams of light paths are obtained by an infrared detection means and a low-light detection means respectively, the infrared detection means and the low-light detection means convert the obtained image into an infrared digital signal image and a low-light digital signal image, both of the infrared detection means and the low-light detection means are connected to one control circuit, on the control circuit is disposed a control unit, the control unit receives the infrared digital signal image and the low-light digital signal image, and performs image registration and image fusion to the infrared digital signal image and the low-light digital signal image, to accomplish two-phase fusion, and transmits a fused image to the display unit for displaying.

Further, the field-of-view obtaining unit and the rang-finding unit are fixed within the accommodation space of the housing, the rang-finding unit comprising a signal emitting end and a signal receiving end, the field-of-view obtaining unit comprising an optical image obtaining end, all of the signal emitting end, the signal receiving end, and the optical image obtaining end being disposed at a front end of the housing, and the signal emitting end and the signal receiving end are symmetrically distributed at an upper side of the optical image obtaining end, a plane formed by the optical image obtaining end being angled with a vertical plane of a gun.

Further, both the signal emitting end and the signal receiving end project above the optical image obtaining end.

Further, the signal emitting end and the signal receiving end are disposed at an upper end or a lower end of the optical image obtaining end.

Further, the front end of the housing is also provided with a protection unit.

Further, night-vision sighting device further comprises three field-of-view regulating units (which are key on the display unit, key provided on the housing and key connected to the housing, respectively).

Further, at a rear end of the housing is provided the display unit, within the accommodation space of the hosing are provided the control unit and a battery assembly, the field-of-view obtaining unit and the display unit being connected through the control unit, the control unit comprising a sensor assembly, the sensor assembly comprising a plurality of sensors that may be an acceleration sensor, a wind speed wind direction sensor, a geomagnetic sensor, a temperature sensor, a barometric sensor, a humidity sensor, and among others; the battery assembly supplying power to power units within the night-vision sighting device.

Further, on the housing is provided a key unit, the key unit comprising an external key assembly and a socket assembly, the external key assembly being provided at a place facilitating the user to use and touch, the socket assembly being connected to the external key assembly through an external connection line, the external key assembly being connected with a secure clip and fixed via the secure clip to a position of a barrel or gun facilitating the user to touch, the key unit being connected onto the control unit.

Further, the control circuit comprises a interface board and a core board, the control unit is integrated on the core board, a field-of-view drive circuit of the field-of-view obtaining unit, a range-finding control circuit in the range-finding unit, a key control circuit of a key unit, a battery control circuit of the battery assembly, and an output end of the two-phase fusion unit are all connected to the core board through the interface board, a display drive circuit of the display unit is connected to the core board.

Further, the core board is also connected with a memory card, the memory card having inside a bullet information database and two ballistic calculation model systems, the control unit applies the two ballistic calculation model systems to perform ballistic calculation, two-phase fusion and denoising processing; the user may select the two types of ballistic models based on settings of the sensor, the ballistic models are an external ballistic 6-degree-of-freedom rigidity model and a low trajectory ballistic model, respectively.

Further, the present invention also provides a calibration method for realizing precise shooting during shooting process of the night-vision sighting device, the calibration method is applied to the night-vision sighting device in the above embodiment, the calibration method comprising: setting a target within a field of view of the night-vision sighting device, measuring a distance from the night-vision sighting device to the target by a range-finding unit of the night-vision sighting device; invoking a plane coordinate via a key unit so as to load onto the display unit, and applying a coordinate center to sight; viewing the field of view of the display unit, controlling a gun, aligning the coordinate center with the target; upon alignment, shooting a first bullet, and obtaining a first impact point on the target, the display unit print-screening an image having the first impact point; and adjusting the field of view of a display screen of the night-vision sighting device, such that a center of the plane coordinate coincides with the first impact point; accomplishing the calibration.

Further, the calibration method may also possibly comprise adding a simulated calibration prior to a first shooting calibration, the simulated calibration simulating an impact point through the ballistic models.

Further, the calibration method may further comprise adding a second shooting calibration after the first shooting calibration, so as to enhance the preciseness of calibration.

In conjunction with the accompanying drawings, features of the present invention will be described in more detail in the following detailed depiction of various embodiments of the present invention.

DETAILED DESCRIPTION OF THE EMBODIMENTS

In order to make the objective, technical solution, and advantages of the present invention more elucidated, the present invention will be described in more detail with reference to the accompanying drawings and embodiments. It should be understood that the preferred embodiments described here are only for explaining the present invention, not for limiting the present invention.

On the contrary, the present invention covers any replacements, modifications, equivalent methods and solutions defined by the claims within the spirit and scope of the present invention. Further, in order to make the public understand better the present invention, some specific detailed portions are elaborated in the following depiction of the details of the present invention.

Figure 1:
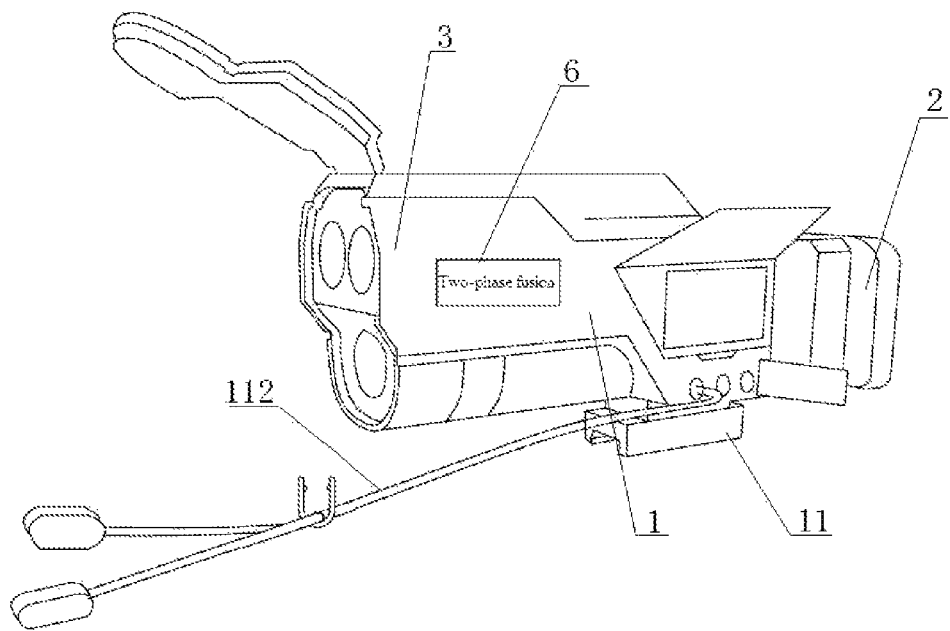
FIG. 1 shows a structural diagram of an appearance of a night-vision sighting device in an embodiment of the present invention.

FIG. 1 shows a structural diagram of an embodiment of the present invention, an infrared-light and low-light two-phase fusion night-vision sighting device is provided in the embodiment of the present invention, the night-vision sighting device comprises a housing 1, in the housing 1 are disposed a field-of-view obtaining unit 31, a display unit, a two-phase fusion unit 6, and a control circuit, the field-of-view obtaining unit 31, via the two-phase fusion unit 6 and the control circuit, displays an obtained image on the display unit.

The two-phase fusion unit 6, by applying infrared night vision and low-light night vision techniques, converts the obtained infrared primary image and low-light primary image into an infrared digital image and a low-light digital image, and a control unit disposed in the control circuit performs fusion processing to the infrared night-vision digital image and the low-light night-vision digital image, to obtain a clear and stable image.

Figure 2:
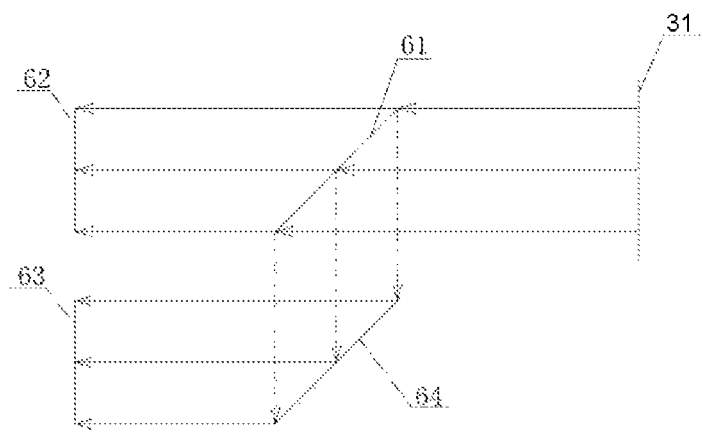
FIG. 2 shows a diagram of a light path principle of a two-phase fusion unit in an embodiment of the present invention.

As shown in FIG. 2, the two-phase fusion unit 6 comprises a semi-transparent and half-reflecting mirror 61, the semi-transparent and half-reflecting mirror 61 is disposed on one side of the field-of-view obtaining unit 31, specifically on one side of the field-of-view obtaining unit 31 relative to the interior of the housing 1, on one side of the semi-transparent and half-reflecting mirror 61 opposite to the field-of-view obtaining unit 31 is disposed a first image sensor 62, the semi-transparent and half-reflecting mirror 61 is disposed at an angle of 45°, on a bottom side of the semi-transparent and half-reflecting mirror 61 is disposed a reflecting mirror 64, the reflecting mirror 64 and the semi-transparent and half-reflecting mirror 61 are parallelly placed, on another side of the reflecting mirror 64 opposite to the field-of-view obtaining unit 31 is disposed a second image sensor 63, in a specific embodiment, the first image sensor 62 is an infrared detector, and the second image sensor 63 is a low-light detector, or the first image sensor 62 is a low-light detector, and the second image sensor 63 is an infrared detector.

A window detected by the infrared detector is of 8-14 μm, and a window detected by the low-light detector is of 0.38-0.93 μm, which substantially covers a wavelength range of 0-14 μm. In the atmosphere, infrared radiation of 1-2.5 μm, 3-5 μm and 8-14 μm can be transmitted by smoothly passing through air at a small loss, therefore, the window detected by the infrared detector and the window detected by the low-light detector can be stably obtained with small loss.

Figure 3:
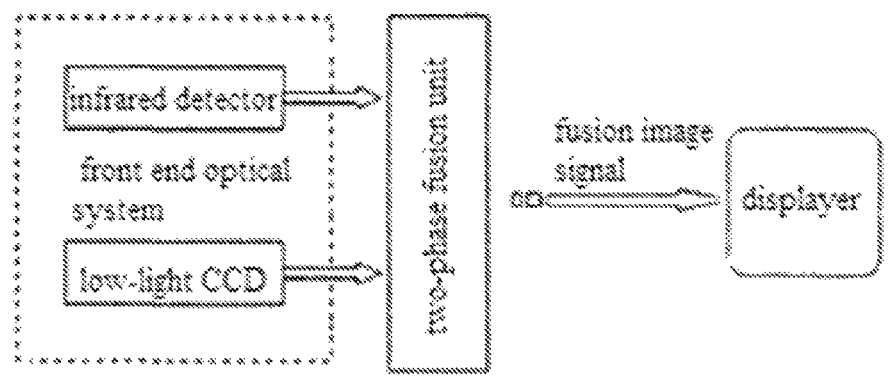
FIG. 3 shows a structural diagram of the two-phase fusion unit in an embodiment of the present invention.

As shown in FIG. 3, the infrared detector obtains a primary infrared image transmitted by the semi-transparent and half-reflecting mirror 61, the infrared detector comprises a planar array composed of multiple micrometering bolometers, the planar array is composed of 320*240 or more micrometering bolometers, when an infrared radiation containing scenery temperature distribution information is imaged on the planar array via an optical system, the temperature of each pixel is caused to change, and further resulting in a changing of electrical resistance, and then the corresponding change is detected by scan addressing and signal processing circuit, to thereby detect a spatial information of the received radiation, and obtain an infrared digital signal image. Wherein, the more micrometering bolometers adopted by the planar array are, the clearer the imaging effect will be.

The low-light detector obtains another primary image reflected by the semi-transparent and half-reflecting mirror 61 and the reflecting mirror 64, and converts it into a low-light digital signal image. The low-light detector comprises an image intensifier, via which an image is subjected to denoising and ashen light intensification, and the low-light digital signal image is obtained. The image intensifier also may be replaced by a camera tube or a charge coupling imager, which can realize the effect of the above image intensifier.

Both of the output of the infrared detector and the output of the low-light detector are simultaneously connected to the control circuit of the night-vision sighting device, the control unit of the control circuit is provided with an image processing unit, the image processing unit receives the above infrared digital signal image and low-light digital signal image, and performs image registration, image fusion and video synthesis to the infrared digital signal image and the low-light digital signal image.

Figure 4:
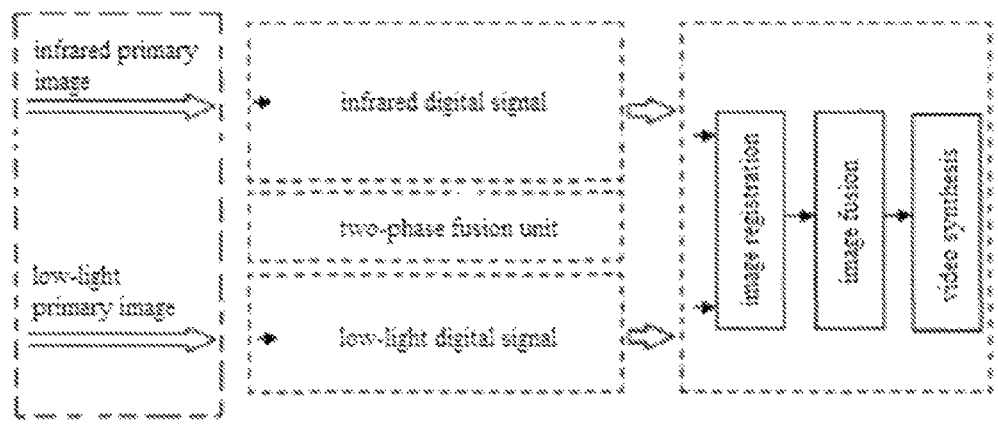
FIG. 4 shows a diagram of image fusion of an infrared digital signal image and low-light digital signal image in an embodiment of the present invention.

As shown in FIG. 4, during converting the primary image into the infrared digital signal image, the primary image containing scenery temperature distribution information is imaged on the planar array composed of multiple micrometering bolometers, which causes the temperature of each pixel to change, and further resulting in a changing of respective electrical resistance, and the change thereof is detected by scan addressing and signal processing circuit, to thereby detect a spatial information of the received radiation, and achieve the purpose of imaging.

The detection responsivity of the micrometering bolometer can be expressed as:

$$R_v = \frac{|a|\eta I R_b R_L}{G(R_b + R_L)\sqrt{1+4\pi^2 f^2 \tau^2}}$$

wherein, a is temperature coefficient of resistance, defined as $a=(1/R_b)(dR_b/dT)$; $\eta$ is the emissivity of a detector; I is bias current, $R_b$ and $R_L$ are a detector resistance and a load resistance respectively; G is the thermal conductance of the detector; f is modulation frequency of radiation signal; $\tau$ is the thermal response time of the detector, defining $\tau=C/G$, wherein C is the heat capacity.

After the process of converting the primary image into low-light digital signal image, the low-light digital signal image is then mainly subjected to denoising processing. The denoising processing in the present invention comprises performing weighted average by utilizing high relativity between two adjacent frames of images and randomness of noise, to achieve the purpose of denoising, it specifically adopts the following formula:

$$K_n' = (1-M)K_n + MK_{n-1}'$$

wherein, $K_n'$ is output image frame after n-time recursion processing, $K_n$ is at-present input image frame, $K_{n-1}'$ is a prior image frame of $K_n'$, M is recursion filter coefficient. In the above formula, when the numerical value of the coefficient M is excessively large, it means that there are fewer movable objects in an image, or the gun sight does not move, i.e. being positioned sighting, which has good denoising effect, but has serious image smearing phenomena (that is, once an object moves, the low-light imaging effect of an image is seriously affected), therefore, the present invention performs automatic selection to the application of M.

The selection of M conforms to piecewise function, error probability p is applied to adjust the piecewise function of M, the error probability is defined as $$p = \frac{\text{error pixel count}}{\text{pixel total count of a frame of image}},$$

and the M conforms to the following piecewise function:

$$M(p) = \begin{cases} M_1 & p \leq p_1 \\ \frac{M_1 - M_2}{p_1 - p_2} \times p + M_1 p_1 - M_2 p_2 & p_1 \leq p \leq p_2 \\ M_2 & p_2 \leq p \leq 1 \end{cases}$$

When an observed target moves slowly, inter-frame change is small, M is given a relatively large coefficient $M_1$, when the target moves at high speed, in order to avoid the appearance of smearing, M is given a relatively small coefficient $M_2$, and when the p is between $p_1$ and $p_2$, the M linearly varies between $M_1$ and $M_2$. Via long-term test measurement, when the value range of $p_1$ is 0.3-0.4; the value range of $p_2$ is 0.65-0.7; the value range of $M_1$ is 0.7-0.8; and the value range of $M_2$ is 0.3-0.5, the denoising effect is optimum.

The infrared digital image and the low-light digital image are subjected to image registration and image fusion in sequence, to accomplish infrared-light and low-light two-phase fusion. Thus, night-vision image featured by clear outline, high resolution, high contrast, high SNR, and low pepper and salt noise are obtained.

For the registration of the infrared image and the low-light image, since the infrared image and the low-light image are images obtained via the same semi-transparent and half-reflecting mirror, the images can be directly superposition-matched.

Then fusion to the infrared image and the low-light image is performed, during the fusion process, standardization to the infrared image is performed in $l\alpha\beta$ space by utilizing color statistical information of low-light image as reference, to realize transferring of the color feature of the low-light image to the infrared image, and fusion is accomplished.

Specifically: firstly a RGB color space of the infrared image is converted into an LMS space:

$$\begin{bmatrix} L \\ M \\ S \end{bmatrix} = \begin{bmatrix} 0.3811 & 0.5783 & 0.0402 \\ 0.1967 & 0.7244 & 0.0782 \\ 0.0241 & 0.1288 & 0.8444 \end{bmatrix} \begin{bmatrix} R \\ G \\ B \end{bmatrix}$$

Logarithm transformation to the LMS space is performed, to reduce the deviation degree of the LMS space data:

$$\begin{bmatrix} L \\ M \\ S \end{bmatrix} = \begin{bmatrix} \log L \\ \log M \\ \log S \end{bmatrix}$$

And finally log LMS space is subjected to orthogonalization processing, so as to be converted into the $l\alpha\beta$ space:

$$\begin{bmatrix} l \\ \alpha \\ \beta \end{bmatrix} = \begin{bmatrix} 1/\sqrt{3} & 0 & 0 \\ 0 & 1/\sqrt{6} & 0 \\ 0 & 0 & 1/\sqrt{2} \end{bmatrix} \begin{bmatrix} 1 & 1 & 1 \\ 1 & 1 & -2 \\ 1 & -1 & 0 \end{bmatrix} \begin{bmatrix} L \\ M \\ S \end{bmatrix}$$

$l\alpha\beta$ is subjected to contravariant operation, and sequentially to a first inverse transformation, exponential transformation to the log LMS space at base 10, and secondary inverse transformation, to convert the LMS space back to the RGB space, thus obtaining:

$$\begin{bmatrix} R \\ G \\ B \end{bmatrix} = \begin{bmatrix} 4.4679 & -3.5873 & 0.1193 \\ -1.2186 & 2.3809 & -0.1624 \\ 0.0497 & -0.2439 & 1.2045 \end{bmatrix} \begin{bmatrix} L \\ M \\ S \end{bmatrix}$$

in the expression, the fusion method of the $l\alpha\beta$ space color comprises: mapping different spectrum images to the RGB space according to straight-line mapping method, and generating direct mapping color fusion image;

Secondly, converting the above infrared RGB space data to the $l\alpha\beta$ space, while converting the low-light image to the $l\alpha\beta$ space, calculating the mean values and standard deviations of the infrared source image and the low-light image in the $l\alpha\beta$ space respectively; and then performing color transmission in the $l\alpha\beta$ space:

$$l_t^* = \frac{\sigma_{l,ref}}{\sigma_{l,s}}(l_s - \mu_{l,s}) + \mu_{l,ref}$$

$$\alpha_t^* = \frac{\sigma_{\alpha,ref}}{\sigma_{\alpha,s}}(\alpha_s - \mu_{\alpha,s}) + \mu_{\alpha,ref}$$

$$\beta_t^* = \frac{\beta_{\beta,ref}}{\beta_{\beta,s}}(\beta_s - \mu_{\beta,s}) + \mu_{\beta,ref}$$

In the expression, $\sigma$ and $\mu$ denote standard deviation and mean value respectively, the subscript ref denotes low-light image, the subscript s denotes infrared source image, the subscript t denotes target fusion image. Performing inverse transformation in the $l\alpha\beta$ space to the $l\alpha\beta$ space data of the target fusion image, the RGB space data of the target fusion image is obtained, that is final fusion image data.

By the above image processing and fusion, a night-vision image featured by image stabilization, clear outline, high resolution, high contrast, high SNR, and low pepper and salt noises is obtained, which is then output to the display unit of the electronic gun sight for displaying.

Figure 5:
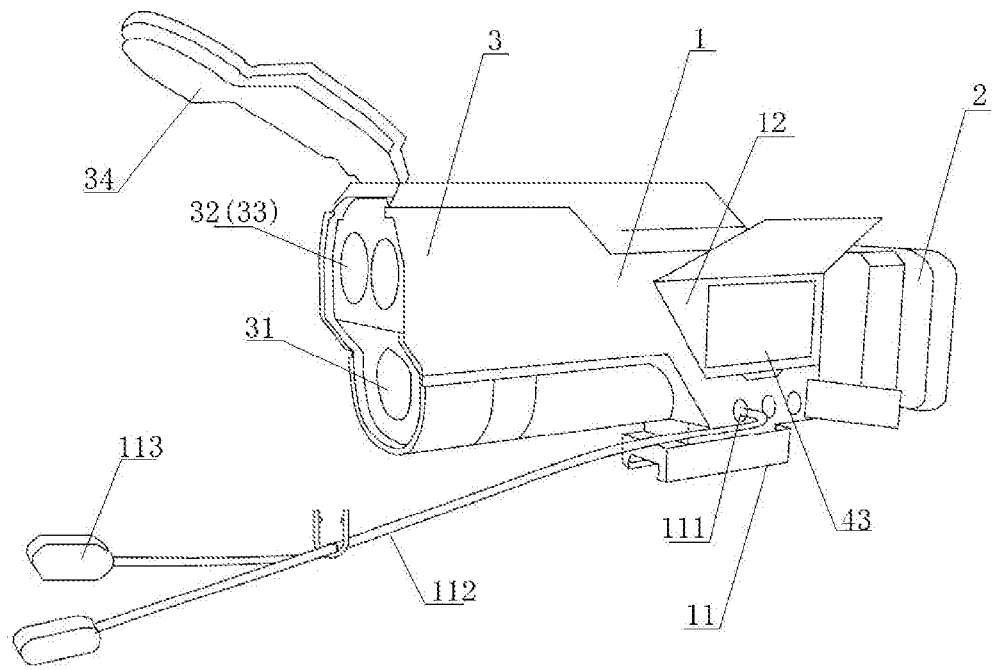
FIG. 5 shows an overall structural diagram of a night-vision sighting device in an embodiment of the present invention.

As shown in FIG. 5, the field-of-view obtaining unit 31 is disposed at the housing front end of the housing 1 of the night-vision sighting device, the field-of-view obtaining unit 31 may be an object lens or an integrated video camera, the field-of-view obtaining unit 31 comprises object lens or other optical device having an amplification function; the optical device or the object lens having an amplification function are mounted at a front end of the field-of-view obtaining unit 31 so as to increase the amplification ratio of the field-of-view obtaining unit.

The display unit may simultaneously display the video or image information collected by the field-of-view obtaining unit 31, the reticle for sighting, information for shooting assistance, and functional information, wherein the video or image information has been processed by the two-phase fusion unit 6 and the control unit; the information for shooting assistance includes: distance information, horizontal angle information, vertical elevation information, and the like, obtained by a sensor, and the functional information includes function menu, zoom regulation, battery level, and remaining video time, etc.

In one embodiment, meanwhile the front end of the housing is equipped with a UV lens and a lens cap 34. The lens cap 34 may perform a 270° flip to fully cover the front end of the housing 3, which protects the field-of-view obtaining unit from not being hurt, protects the lens and facilitates cleaning.

Figure 6:
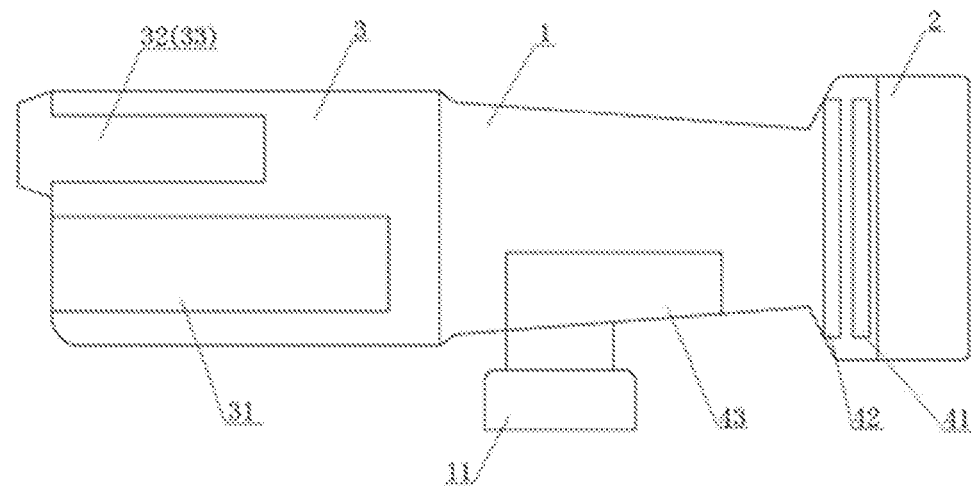
FIG. 6 shows a structural sectional view of a night-vision sighting device in an embodiment of the present invention.
Figure 7:
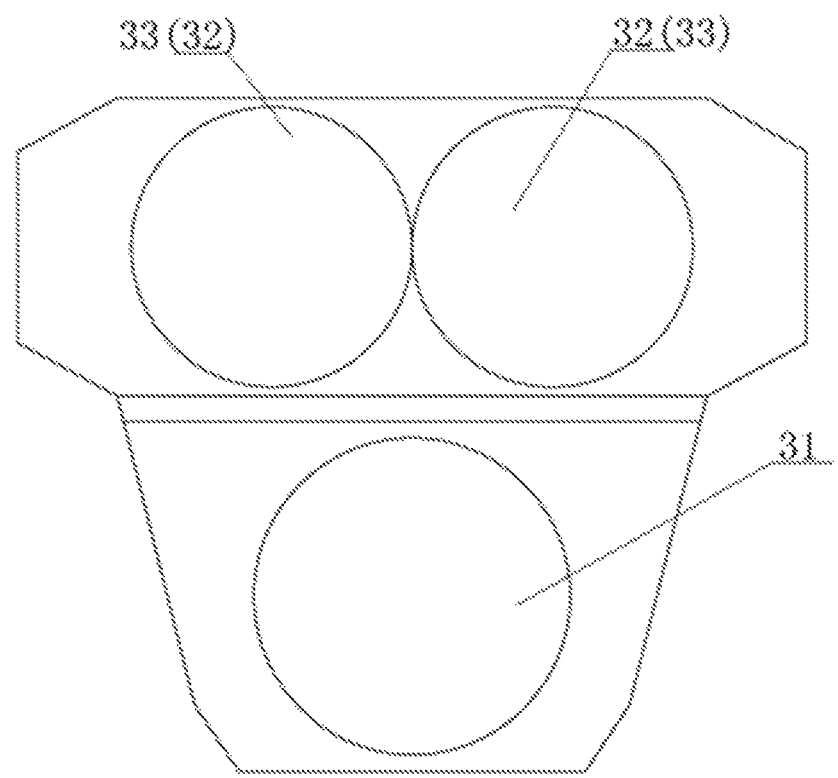
FIG. 7 shows a diagram of a front end of a housing of a night-vision sighting device in an embodiment of the present invention.

As shown in FIGS. 6 and 7, in the above embodiment, the night-vision sighting device comprises a range-finder that is a laser range-finder. The range-finder is located within the housing 1. The laser range-finder is a pulse-type laser range-finder;

The laser range-finder comprises a laser emitting end and a laser receiving end 33. Both the laser emitting end 32 and laser receiving end 33 are disposed at a front end of the housing 1 and symmetrically distributed above the camera of the integrated video camera. The laser emitting end 32, laser receiving end 33, and the camera of the integrated video camera form an equilateral inverted triangle or an isosceles inverted triangle. Both the laser emitting end 32 and the laser receiving end 33 project above the front end of the housing 1, and the laser emitting end 32 and the laser receiving end 33 have a certain height difference over the field-of-view obtaining unit 31; moreover, the laser emitting end 32 and the laser receiving end 33 project above the housing front end 3. Such design narrows the housing internal space occupied by the laser range-finder. By projecting the extra-long portions of the laser emitting end 32 and the laser receiving end 33 outside of the housing front end 3, a high integration of the internal space of housing 1 is realized, such that the night-vision sighting device becomes more miniaturized, more flexible, and more portable; additionally, because the thickness of the object lens of a common field-of-view obtaining unit is higher than the thickness of the lens of the laser emitting end and receiving end, this design may reduce the laser range-finding error.

The lens cap 34 as mentioned in the above embodiment may cover the field-of-view obtaining unit as well as the front end of the laser range-finder, so as to protect the laser range-finder from being damaged.

The laser emitting end 32 has a laser source therein. Under the control of a night-vision sighting device control means or a core board, the laser source emits one or more laser beam pulses within the field-of-view of the night-vision sighting device; the laser receiving end 33 receives a reflective beam of one or more laser beam pulses, and transmits it to the control circuit f the night-vision sighting device; the laser emitted by the laser emitting end 32 is received by the laser receiving end 33 after being reflected by the measured object. The laser range-finder simultaneously record the round-trip time of the laser beam pulse. A half of a product of the light velocity and round-trip time is the distance between the range-finder and the measured object.

The laser range-finder according to the embodiments of the present invention adopts a semiconductor laser with a work wavelength of 905 nanometer or 1540 nanometer. First, it avoids damage to the human body by the laser; meanwhile, the photoelectric detector can accurately determine the start and end points of the laser pulse and accurately measure the flying time of the laser. By controlling the frequency of the reference clock pulse above 1.5 GHz, error will be reduced.

The control unit disposed within the housing 1 for connecting the field-of-view obtaining unit 31 and the display unit comprises a CPU core board 41 and an interface board 42. The interface board 42 is connected to the CPU core board 41. Specifically, the input and output of the CPU core board 41 are connected through a serial port at a bottom side of the interface board 42, and the CPU core board 41 is disposed at one side of the display unit display screen relative to the inside of the housing 1. The interface board 42 is disposed at one side of the CPU core board 41 opposite to the display screen. The display screen, CPU core board 41, and the interface board 42 are disposed parallel to each other. The integrated video camera and the range-finder are connected to the interface board 42 through a wiring. The image information obtained by the integrated video camera and the distance information obtained by the range-finder are transmitted to the CPU core board 41 through the socket board 42, and then the information is displayed on the display screen via the CPU core board 41; The CPU core board is namely the core processing device of the night-vision sighting device.

The CPU core board 41 may be connected to a memory card via the interface board 42 or directly connected to the memory card. In the embodiments of the present invention, a memory card slot is provided at a top position of the CPU core board 41. The memory card is plugged into the memory card slot. The memory card may store information. The stored information may be provided to the CPU core board 41 for calculation of a ballistic equation. The memory card may also store feedback information transmitted by the CPU core board 41.

A USB interface is also provided at the memory card slot edge side at the top of the CPU core board. Through the USB interface, information from the CPU core board may be outputted, or the software program disposed within the CPU core board may be upgraded and optimized.

Figure 8:
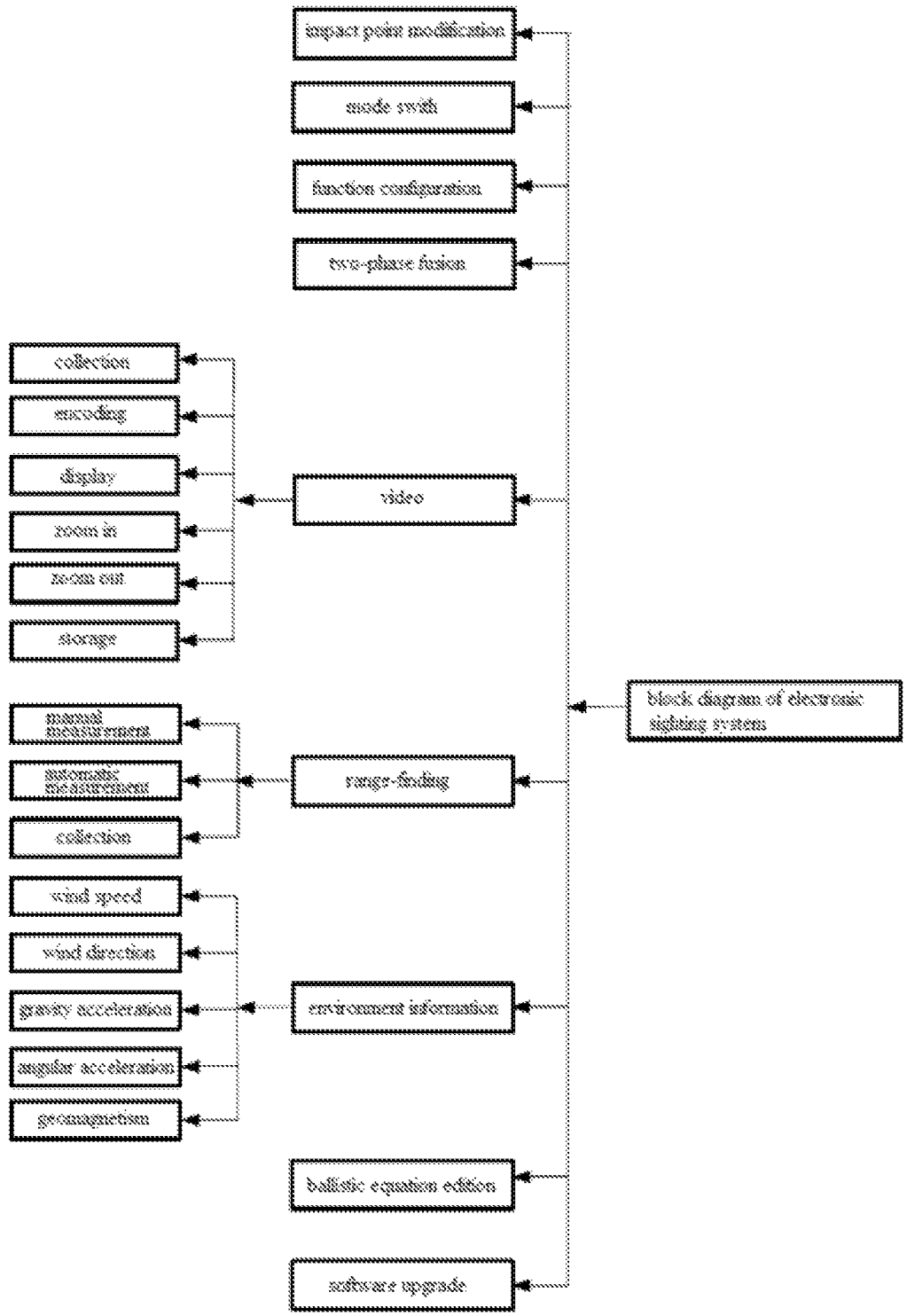
FIG. 8 shows a system block diagram of a night-vision sighting device in an embodiment of the present invention.
Figure 9:
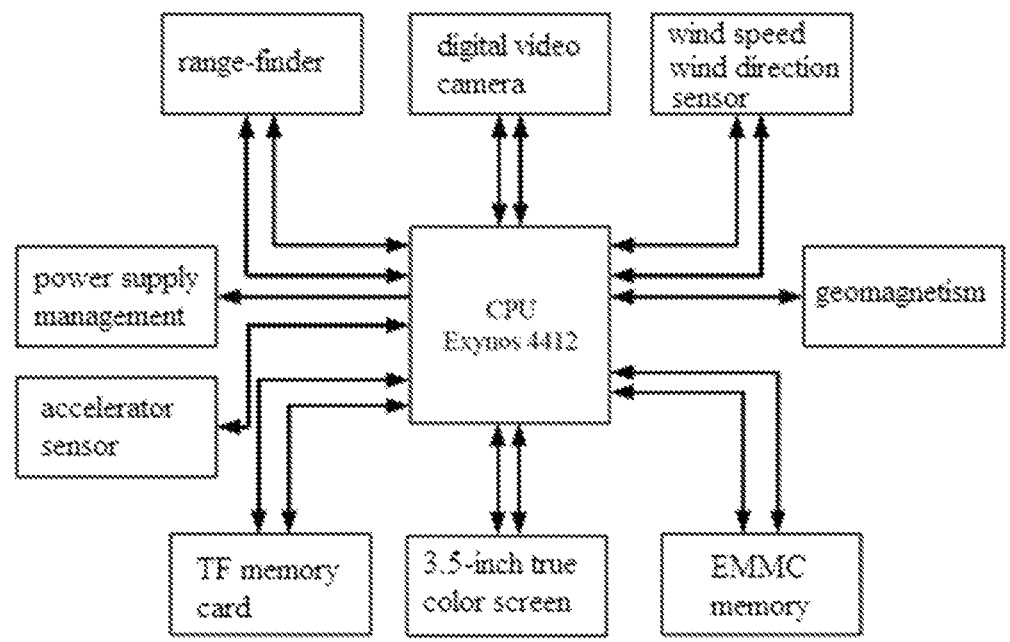
FIG. 9 shows a structural diagram of a sensor assembly of a night-vision sighting device in an embodiment of the present invention.

As shown in FIGS. 8 and 9, the night-vision sighting device further comprises a plurality of sensors, specifically an acceleration sensor, a wind speed wind direction sensor, a geomagnetic sensor, a temperature sensor, a barometric sensor, a humidity sensor, etc. The acceleration sensor and the geomagnetic sensor are integrated on the CPU core board 41. The acceleration sensor is a chip MPU-6050 integrating a gyro and an acceleration meter; the geomagnetic sensor is a three-axis magnetometer MAG3110; the wind speed wind direction sensor is disposed external to the night-vision sighting device and connected onto the interface board 42. The temperature sensor, barometric sensor, and humidity sensor may be integrated on the CPU core board or connected onto the CPU core board through the interface board. All of the above sensors employ an ICC interface.

Within the housing 1 is also disposed a battery compartment 12. Within the battery compartment 12 is provided a battery assembly 43, within the battery compartment 12 is provided a slide way for plugging the battery assembly 43 in and out. The battery compartment 12 is disposed at a middle bottom side within the housing 1. Through a side edge of the housing 1, a battery compartment cover may be opened to change the battery assembly 43. In order to prevent slight deviation in battery size of the same model, a layer of sponge (or foam, bubble cotton) is provided at the internal side of the battery compartment cover. The sponge structure disposed at the internal side of the battery compartment cover may also prevent battery instability caused by shock from gun shooting.

A battery circuit board is provided at an upper side of the battery assembly 43. The battery assembly 43 supplies power to various elements of the night-vision sighting device through the battery circuit board, and meanwhile the battery circuit board is connected to the CPU core board 41 via the interface board 42.

In one embodiment, the battery assembly 43 specifically employs a voltage of 7.2-7.4V; a capacity of 3900-5700 mAh; an electrical work of 28.08 Wh-42.2 Wh; and a weight of 100-152 g.

An external key is provide at the external side of the housing 1 close to the display unit. The external key is connected on the socket board 42 via a key control board at the internal side of the housing 1. By touching and pressing the external key, the information on the display unit may be controlled, selected and modified. The specific position of the external key is 5-10 cm away from the display unit.

The external key is specifically disposed to the right of the display unit. However, the specific position of the external key is not limited to the above position. Instead, it should be disposed at a position facilitating the user to use and press. The user controls the CPU core board through the external key. The CPU core board drives the display screen to display. The external key may control selection of a shooting target in a view zone displayed on the display unit, or control the night-vision sighting device to start a laser range-finder, or control a video camera unit of the night-vision sighting device to regulate the focal distance of the gun sight, etc.

Figure 10:
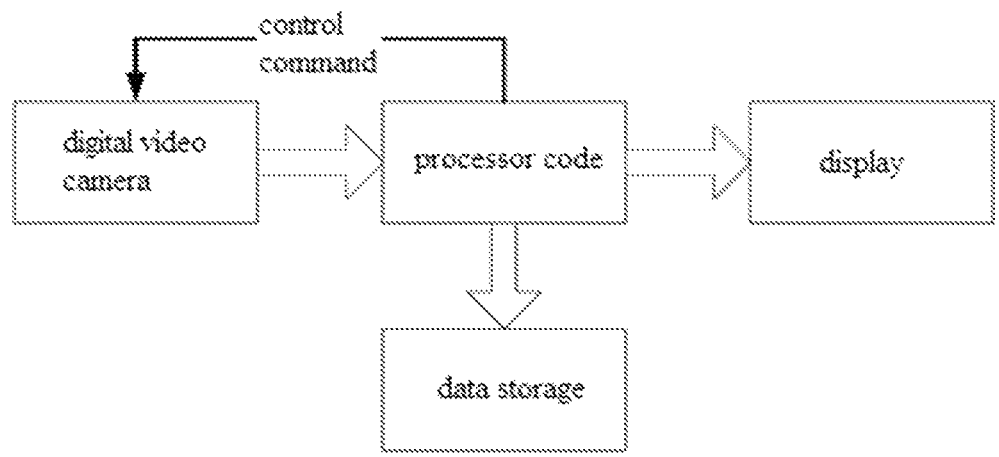
FIG. 10 shows a system diagram of field-of-view obtaining, storage, and feedback control of a night-vision sighting device in an embodiment of the present invention.
Figure 11:
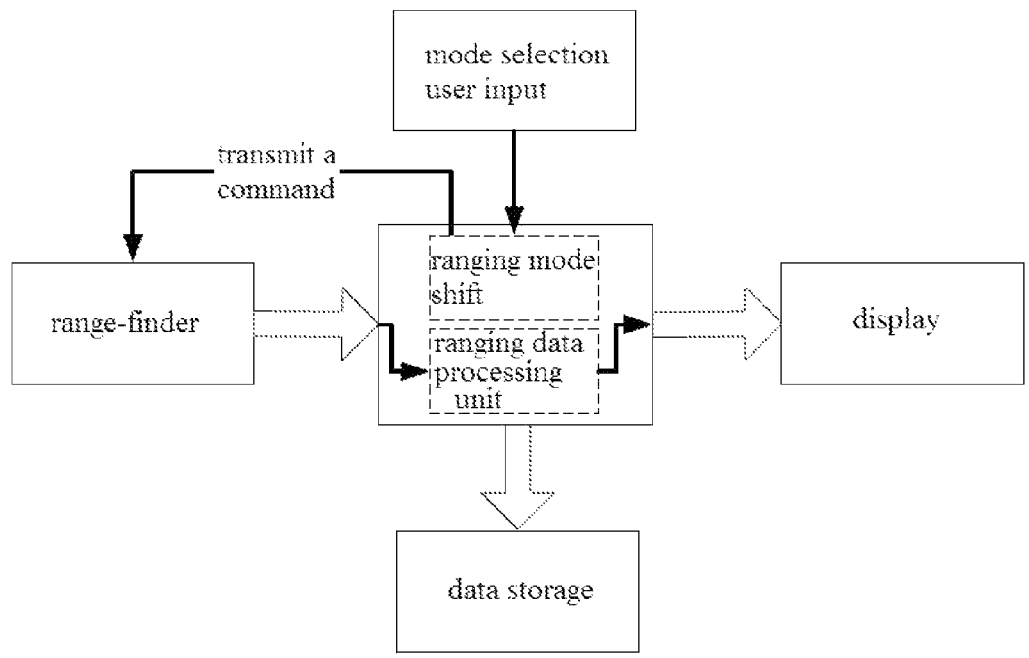
FIG. 11 shows a work diagram of a range-finder of a night-vision sighting device in an embodiment of the present invention.
Figure 12:
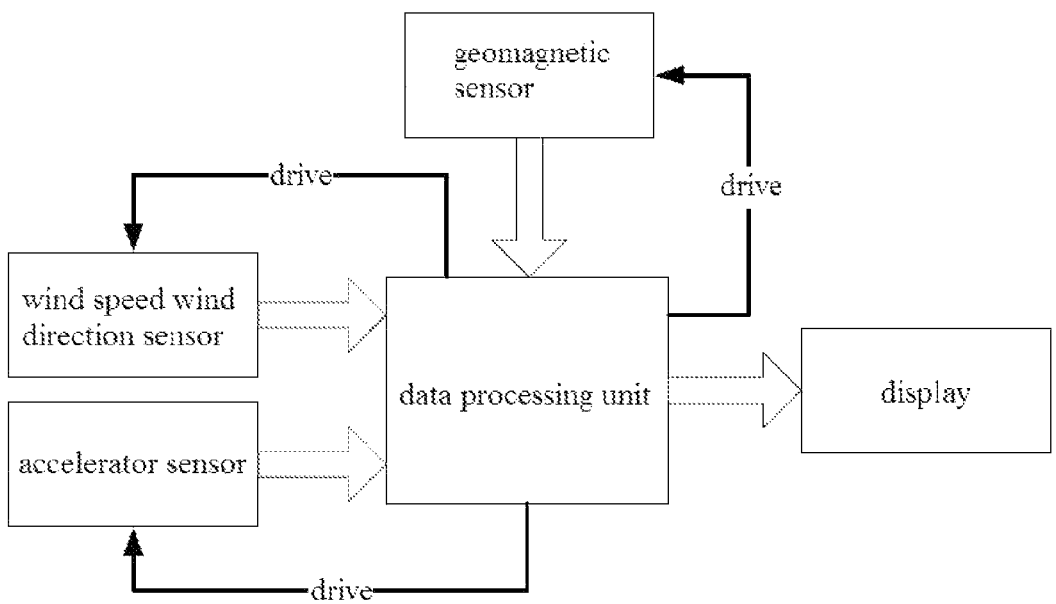
FIG. 12 shows a work diagram of a sensor assembly of a night-vision sighting device in an embodiment of the present invention.

As shown in FIG. 10-FIG. 12, in another one embodiment, the key control board for the external key may be provided with a wireless connection unit, through which peripheral devices are connected. The periphery devices include a smart phone, a tablet computer, etc. then, program is loaded through the periphery devices, which may control selection of a shooting target in a view zone displayed on the display unit, or control the night-vision sighting device to start a laser range-finder, or control a video camera unit of the night-vision sighting device to regulate the focal distance of the gun sight, etc.

At the external side of the housing 1 is further provided an external slot 111. A portion of the external slot 111 disposed at the internal side of the housing is connected to the key control board. A portion of the external slot 111 disposed at the external side of the housing is connected to an external connection line 112. The external connection line 112 is connected to an external key 113 through which the user may control selection of a shooting target in a view zone displayed on the display unit, or control the night-vision sighting device to start a laser range-finder, or control a video camera unit of the night-vision sighting device to regulate the focal distance of the gun sight, etc.

The external connection line 112 may also be connected to other operating devices, or ancillary shooting devices, or video display devices; or information and video may be transmitted through the external connection line. All of the other operating devices comprise an external control key, a smart phone, a tablet computer, etc. One end of the external connection line 112 is socketed within the external socket slot 111; the other end is provided with a "U"-shaped clip. The external connection line is clipped on the gun barrel through the "U"-shaped clip, thereby securing the external connection line 112 and preventing affecting shooting. In one embodiment, an operating device connected through the external connecting line 112 may select a target in the view zone, start a laser range-finder, or adjust a gun sight focal distance, etc.; the "U"-shaped clip provide simple and convenient zooming and focusing operations for a gun without a support.

The display unit is a LCD display. A touch operation may be implemented on the LCD display. The size of the display may be determined based on the actual needs. In the present invention, the display screen as adopted is sized to 3.5 inches.

In one embodiment, the LCD display screen has a resolution of 320*480, the work temperature is −20±70° C., the backlight voltage is 2.9 v, and the voltage between the LCD screen and the GPU interface is 1.8 v; the touch screen is a capacitive touch screen.

The reticle (front sight) displayed on the display screen and the video information collected by the field-of-sight obtaining unit are superimposed. The reticle is for sighting and shooting, while the display screen also displays ancillary shooting information for facilitating shooting and transmitted by various sensors above and work indication information;

The ancillary shooting information includes environment information, distance information, and angle information;

The environment information includes wind speed data, temperature data, barometer data, and magnetic field data. The wind speed data is disposed at one end of the upper side of the display screen. The magnetic field data is disposed at a middle part of the lower side of the display screen. The temperature data and barometric data are disposed at the other end of the upper side of the display screen;

The distance information is disposed above the temperature data and barometric data;

The angle information includes the elevation angle data and azimuth angle data, where the elevation angle data is disposed beneath the wind speed data, while the azimuth angle data is disposed in the middle part of the upper side of the display screen.

The work indication information comprises battery level information, wireless signal information, remaining recording time, multiple information, shift key, and menu key;

The battery level information is disposed beneath the elevation angle data, while the remaining recording time, multiple information, and wireless signal information are disposed successively beneath the temperature data; the shift key and menu key are disposed at two ends of the lower side of the display screen.

The ancillary shooting information in the above embodiments are partially applied in a ballistic equation, and partially used for displaying to alert the user.

The night-vision sighting device may also possibly comprise one or more ports and a radio transceiving unit. The one or more ports and radio transceiving unit may communicate with a smart phone or other terminal devices through a wired or wireless connection.

The other information includes Wi-Fi signal, battery, state shift key, menu key, remaining recording time, recording key, and current multiples. The LCD display screen provided by the present invention may perform shift between daylight/night work modes. The night work mode is implemented through infrared light compensation.

Based on the structure of the above night-vision sighting device, its CPU core board 41 is further connected with a memory card. Within the memory card, bullet information database and two ballistic calculation model systems are set. The user may select one of the two ballistic models based on the setting of the sensor. The ballistic models are an external ballistic 6-degree-of-freedom rigidity model and a low trajectory ballistic model, respectively. Through the two ballistic models, the night-vision sighting device realizes a precise positioning.

In order to accurately predict the position of an impact point, the impact point is predicted using an external ballistic 6-degree-of-freedom rigidity model based on the data collected by various sensors and the bulletin data stored in the memory.

When a shot is flying in the air, the force and torque acting on the shot are mainly the acting force from the earth and aerodynamic force. Generally, the motion of the shot may be decomposed into center of mass motion and motion around the center of mass, which are described by momentum lar and law of moment of momentum.

In the 6-degree-of-freedom rigidity model, the shot in spatial movement is regarded as a rigidity. It considers three free degrees of the center of mass of the shot and three free degrees rotating around the center of mass. And all forces and torques acted on the shot are considered.

In the above model, the parameters that need to be input include: 1) atmospheric conditions: wind speed wind direction, temperature, air pressure, humidity; 2) shooting position: altitude and latitude, as well as elevation coordinates of the shooting point; 3) shooting condition: initial velocity and direction of the bullet outlet, wherein the direction is represented by the elevation angle and azimuth angle of the gun barrel; 3) bullet-target distance: obtained through a laser range-finder; 4) bullet data (stored in the database): mass of the shot, cross-section area of the shot, mass eccentricity (or rotational inertia), resistance coefficient, etc.

Figure 13:
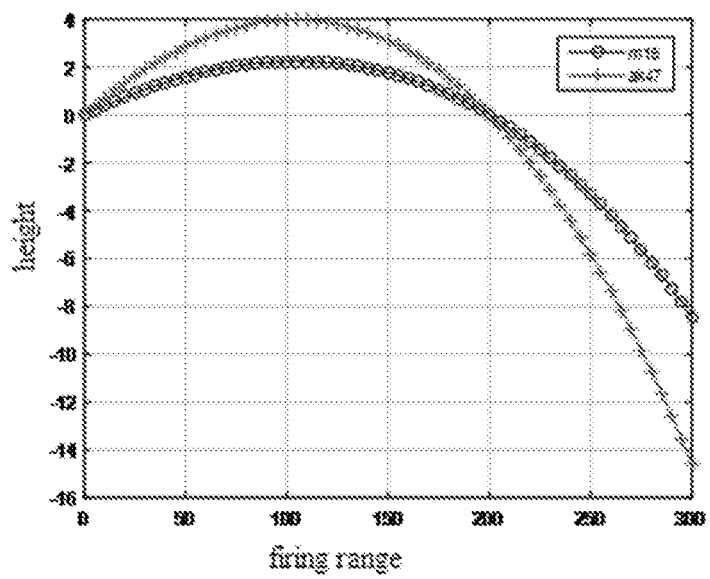
FIG. 13 shows a ballistic simulation comparison diagram for two shots by applying an external ballistic 6-degree-of-freedom rigidity model to a night-vision sighting device in an embodiment of the present invention.
Figure 14:
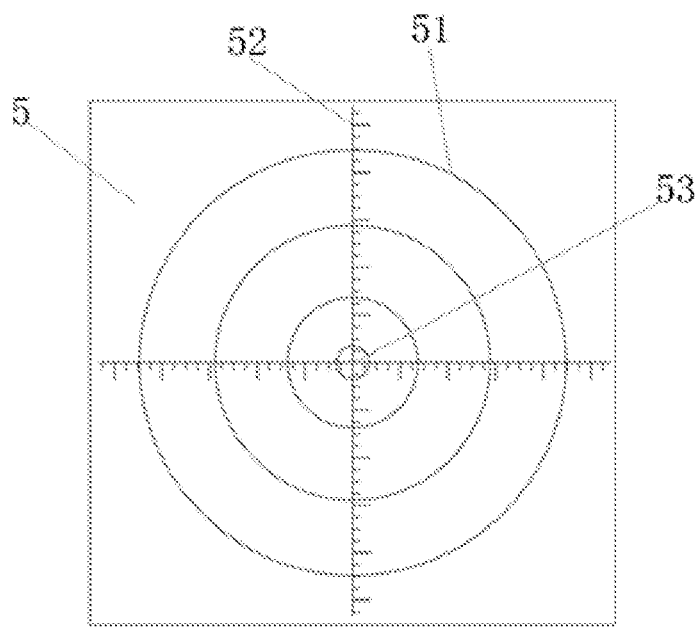
FIG. 14 shows a schematic diagram of a display unit before calibration in a night-vision sighting device calibration method in an embodiment of the present invention.
Figure 15:
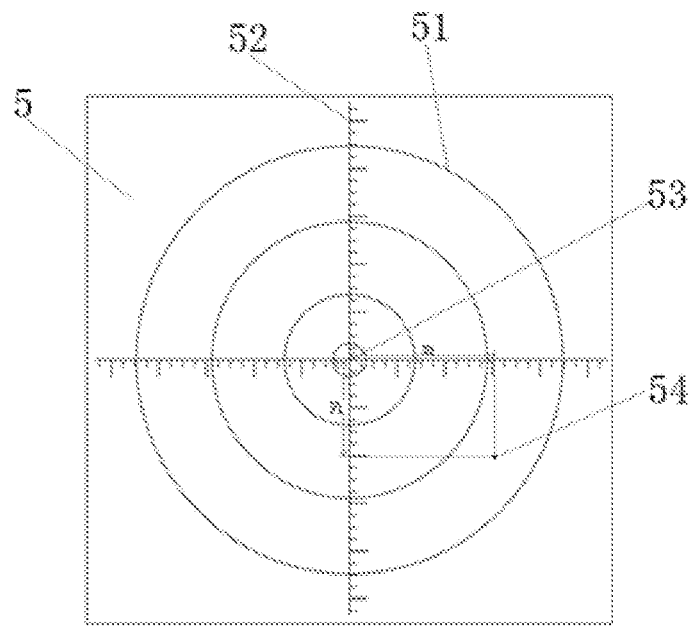
FIG. 15 shows a schematic diagram of a display unit having a first impact point in a night-vision sighting device calibration method in an embodiment of the present invention.
Figure 16:
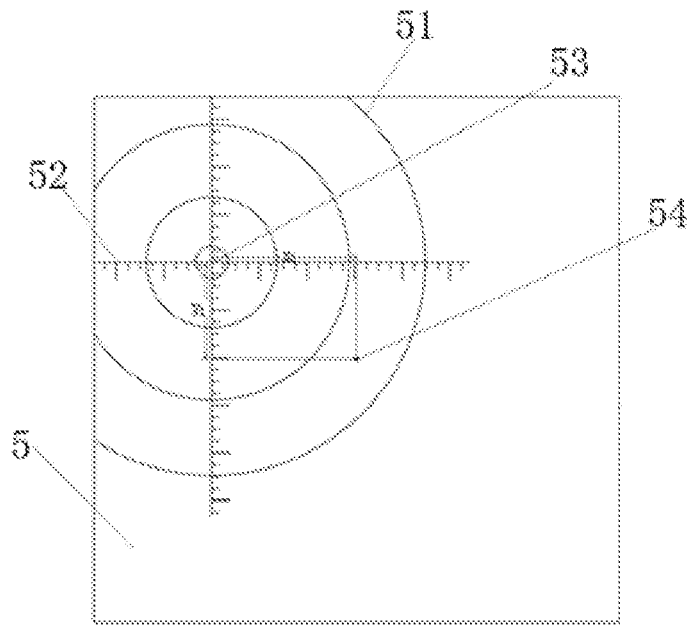
FIG. 16 shows a local enlarged view of FIG. 15 embodiment of the present invention.
Figure 17:
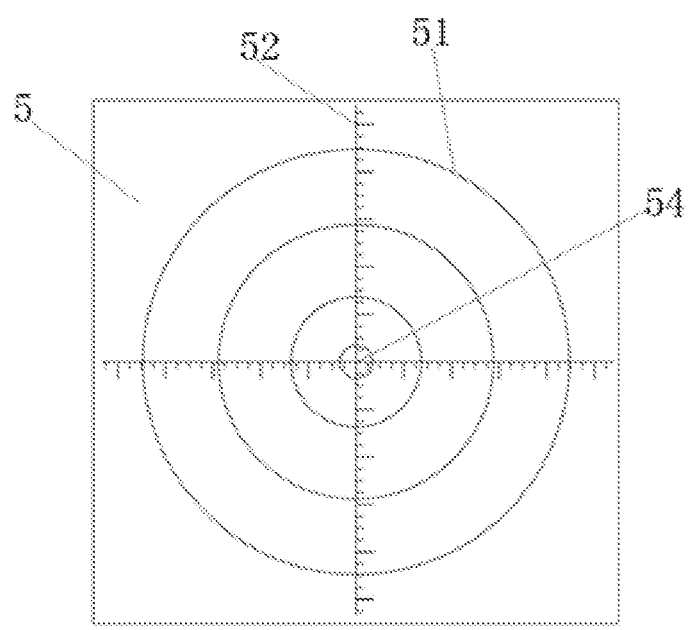
FIG. 17 shows a display unit diagram after a first shooting calibration in a night-vision sighting device calibration method in an embodiment of the present invention.

FIG. 13 illustrates simulated calculations for a M16 233 Rem, 55 g, PSP shot and an AK47 (7.62×39 mm), 125 g, PSP shot. The simulation is performed only to vertical direction, and lateral direction is temporarily omitted. Supposed environment conditions: bullet-target distance 200 m, launching height 0.001 m, height 500 m, temperature 50 Fahrenheit degrees. It is seen from the figure that in order to shoot targets of a same distance, both initial launching heights are different; based on restriction conditions measured according to weather, the required launching height and launching direction are resolved; they may be regulated to hit a target at a certain distance.

Comprehensive factors are considered in the 6-degree-of-freedom model, in practical applications, the model can be simplified dependent on different combinations of sensors.

In another scenario, if the wind force and wind speed are not high and the acting force of the lateral wind is very small, the low trajectory ballistic model is employed. In the low trajectory ballistic model, impacts from the low wind speed wind direction, temperature, air pressure, humidity might not be considered.

The low trajectory may be understood such that the arc variation of the bullet trajectory (i.e., parabola) approaches to a straight line. The closer to the straight line, the lower trajectory it is. Low trajectory ballistic calculation refers to ballistic calculation under a condition of small angle of fire; based on the feature that the resistance coefficient of a low-speed shot approximates a constant (specifically, for a low trajectory, under a standard weather condition, the air density function is approximately 1, the sound velocity is regarded as a constant; therefore, the resistance coefficient is a function of the bullet speed), external ballistic 6-degree-of-freedom basic equation may be simplified to resolve an equation of shooting elements of any point of the low-speed low trajectory, thereby finding a calculation method for resolving the shooting elements at the apex of the trajectory, the shooting elements at the impact point, and the point-blank range.

The present invention also discloses other embodiments for solving the following problems: when a user prepares to determine a distance of a specific target, the vibration of human body itself will cause the vibration of a gun, which further changes sighting point of laser beam to generate an offset from the specific target. Therefore, multiple distance values of different objects are generated in a view of field, the feedbacks of distance data are excessive, or distance data are continually obtained and fed back, which will raise the computation quantity of a processing device and increase burden thereof. In one embodiment of the present invention, the night-vision sighting device configures a direction value for the laser beam emitted from a laser source, the direction value is a specific direction value in a three-dimensional coordinate system which is constructed by taking the night-vision sighting device as a center base point, in combination with another specific point (not in the vertical direction of the center base point) inside or outside of the view of field, and the vertical direction of the center base point. Base on the direction value, a distance value on the direction value has been precisely determined, without the need of range-finding to the direction value, which avoids the continual obtainment of distance data and feedback of distance data by the laser range-finder, meanwhile, the direction value and the distance value may be recorded and stored a memory card of night-vision sighting device, or be transmitted to an external terminal equipment/smartphone via wireless or wired manner, or be uploaded to an external backstage control system, for being searched and accessed at any moment.

As shown in FIG. 14-FIG. 17, the present invention also provides a calibration method for realizing precise shooting during shooting process of the night-vision sighting device, the calibration method is applied to the night-vision sighting device in the above embodiment, the calibration comprises steps of:

1. setting an objective target 51 within a field of view 5 of the night-vision sighting device, and measuring a distance from the night-vision sighting device to the objective target through a laser range-finder of the night-vision sighting device;

2. invoking a plane coordinate 52 through an external key, loading the plane coordinate 52 on the display screen, a coordinate center 53 coinciding with a reticle center;

3. watching the field of view 5 of the display screen of the night-vision sighting device, and controlling a gun to make the coordinate center 53 in alignment and coincidence with the objective target within the field of view;

4. after alignment and coincidence, shooting a first bullet, and obtaining a first impact point 54 on the objective target, the display screen print-screening an image of the first impact point 54;

5. recording values of horizontal coordinate and longitudinal coordinate of the first impact point in the plane coordinate, e.g., $x_1$, $y_1$, and regulating the field of view of the display screen of the night-vision sighting device; moving in the horizontal coordinate direction by $-x_1$; moving in the longitudinal coordinate direction by $-y_1$, such that the center of the plane coordinate coincides with the first impact point;

6. accomplishing calibration.

Before the first calibration shooting in the above embodiment, it always occurs that the first shooting deviates greatly, and the impact point does not fall within the target in the field of view. In order to avoid occurrence of the above condition, it is proposed in one embodiment of the present invention that through a ballistic model in the above embodiment, performing simulated shooting to the target in the field of view in step 1 to find a simulated impact point; then, performing simulation and calibration based on the simulated impact point; then possibly selecting the first shooting calibration. This may guarantee that the impact point of the first shooting falls on the target.

According to the calibration method provided in the present embodiment, the core controller real-time receives the environment values collected by sensors, the distance from the gun sight to the sighted object measured by the laser range-finder, and bullet information provided by the memory. The ballistic model calculates a ballistic curve of the bullet based on the real-time varied environment values, consecutive non-discrete distance information, and bullet information, thereby obtaining a simulated impact point, and real-time applies the calculated impact point to determine and regulate a reticle, such that when the night-vision sighting device sights any sighted object at a consecutive non-discrete distance under any environment, the reticle can be regulated in real time based on a ballistic curve calculation model, such that the reticle center is close to the actual impact point, thereby achieving an effect of non-polar reticle.

In one embodiment, after the first calibration shooting is completed, in order to further enhance the preciseness, a second shooting calibration may be performed, comprising steps of:

Steps 1-5 are identical to the above embodiment, thereby omitted here;

6. make a second shooting to shoot a second bullet, obtaining a second impact point on the objective target, allowing the display screen to print screen an image having the first impact point and the second impact point;

7. recording the numerical values of the horizontal coordinate and longitudinal coordinate of second impact point in the plane coordinate, e.g., $x_2$, $y_2$, and regulating the field of view of the display screen of the night-vision sighting device; moving in the horizontal coordinate direction by $-x_2$; moving in the longitudinal coordinate direction by $-y_2$, such that the center of the plane coordinate coincides with the first impact point;

8. accomplishing calibration.

In one embodiment, the display screen print-screens an image by obtaining an instruction signal transmitted from the CPU core board, the memory card caches vibration parameters generated when a plurality of guns of various models shoot bullets. The vibration parameters may include: a vibration frequency, a vibration amplitude, and a vibration duration. The CPU core board may be connected to a sensor obtaining a vibration parameter. The sensor is a vibration sensor of a known technical kind. The obtained vibration parameters are matched with vibration parameters cached in the memory card. In the case of a successful match, it is confirmed as a shooting vibration; then the core control board sends a snapshot instruction signal to the display screen to control the display screen to snapshot.

The calibration method provided by the present invention realizes accurate calibration under the current environment values by making the reticle in coincidence with the impact point through specific shooting.

The invention claimed is:

1. An infrared-light and low-light two-phase fusion night-vision sighting device, comprising:
    a field-of-view obtaining unit for obtaining a first image information within a field of view for sighting;
    a two-phase fusion unit for obtaining an infrared digital image and a low-light digital image of the first image information;
    a control unit, disposed in a control circuit, for denoising the low-light digital image and fusing the infrared digital image with the low-light digital image to form a second image information;
    and a display unit for displaying reticle and the second image information.

2. The infrared-light and low-light two-phase fusion night-vision sighting device according to claim 1, wherein the two-phase fusion unit comprises:
    a first image obtaining unit for obtaining an infrared primary image of the first image information and converting the infrared primary image into an infrared digital signal image; and
    a second image obtaining unit for obtaining a low-light primary image of the first image information and converting the low-light primary image into a low-light digital signal image.

3. The infrared-light and low-light two-phase fusion night-vision sighting device according to claim 2, wherein the two-phase fusion unit further comprises a light-splitting device for splitting the first image information into the infrared primary image and the low-light primary image.

4. The infrared-light and low-light two-phase fusion night-vision sighting device according to claim 3, wherein the first image obtaining unit is an infrared detector and the second image obtaining unit is a low-light detector.

5. The infrared-light and low-light two-phase fusion night-vision sighting device according to claim 4, wherein the control unit has a CPU disposed in the control circuit connected to the two-phase fusion unit, whereby the control unit receives the infrared digital signal image and the low-light digital signal image outputted by the two-phase fusion unit.

6. The infrared-light and low-light two-phase fusion night-vision sighting device according to claim 5, wherein the control unit performs superposition, registration, and fusion of the infrared digital image and the low-light digital image, wherein, during a fusion process, the infrared image is standardized in a LAB color space by utilizing a color statistical information of the low-light image as reference to transfer a color feature of the digital low-light image to the digital infrared image.

7. The infrared-light and low-light two-phase fusion night-vision sighting device according to claim 4, wherein a window detected by the infrared detector is of 8-14 μm in size, and a window detected by the low-light detector is of 0.38-0.93 μm in size.

8. The infrared-light and low-light two-phase fusion night-vision sighting device according to claim 4, wherein the light-splitting device is a semi-transparent and half-reflecting mirror.

9. The infrared-light and low-light two-phase fusion night-vision sighting device according to claim 8, wherein the semi-transparent and half-reflecting mirror is disposed within the sighting device and opposite to the field-of-view obtaining unit, on one side of the semi-transparent and half-reflecting mirror away from the field-of-view obtaining unit is disposed the low-light detector or the infrared detector, in a direction perpendicular to an imaginary line connecting the semi-transparent and half-reflecting mirror and the field-of-view obtaining unit is disposed a reflecting mirror that is parallel to the semi-transparent and half-reflecting mirror, and on one side of the reflecting mirror away from the field-of-view obtaining unit is disposed the infrared detector or the low-light detector.

10. The infrared-light and low-light two-phase fusion night-vision sighting device according to claim 9, wherein the semi-transparent and half-reflecting mirror is placed at a 45° angle relative to an incident light through the field-of-view obtaining unit.

11. The infrared-light and low-light two-phase fusion night-vision sighting device according to claim 1, wherein the control circuit is electrically coupled with one or more sensor selected from the group consisting of an acceleration sensor, a wind speed wind direction sensor, a geomagnetic sensor, a temperature sensor, a barometric sensor, and a humidity sensor.

12. The infrared-light and low-light two-phase fusion night-vision sighting device according to claim 1, further comprising a housing and a range-finding unit,
    wherein the range-finding unit measures a distance information from a sighted object to the night-vision sighting device,
    and the field-of-view obtaining unit, the display unit, the two-phase fusion unit, the range-finding unit, and the control circuit are disposed in the housing.

13. The infrared-light and low-light two-phase fusion night-vision sighting device according to claim 12, wherein the range-finding unit comprises a signal emitting end and a signal receiving end; the field-of-view obtaining unit comprises an optical image obtaining end; the signal emitting end, signal receiving end, and the optical image obtaining end are all disposed at a front end of the housing, and the display unit is disposed at a rear end of the housing.

14. The infrared-light and low-light two-phase fusion night-vision sighting device according to claim 13, wherein the signal emitting end and the signal receiving end are disposed above and symmetrically with respect to the optical image obtaining end.

15. The infrared-light and low-light two-phase fusion night-vision sighting device according to claim 12, further comprising:
a first field-of-view regulating unit disposed on the display unit, a second field-of-view regulating unit being affixed to the housing, and a third field-of-view regulating unit connected to the housing,
wherein the first field-of-view regulating unit performs regulation to the field of view through a touch display unit, the second field-of-view regulating unit comprises a plurality of keys, the third field-of-view regulating unit comprises an external connection slot affixed to the housing, an external connection line, and one or more external keys, the external keys being connected to the external connection slot through the external connection line.

16. The infrared-light and low-light two-phase fusion night-vision sighting device according to claim 15, wherein the external connection line has a first end and a second end, wherein the first end is connected to the external connection slot, the second end comprises a plurality of end branches, each of the plurality of end branches being connected to one of the plurality of external keys.

17. The infrared-light and low-light two-phase fusion night-vision sighting device according to claim 16, wherein the external connection line comprises a secure clip.

18. The infrared-light and low-light two-phase fusion night-vision sighting device according to claim 1, wherein the display unit further displays an ancillary shooting information and a work indication information.

19. The infrared-light and low-light two-phase fusion night-vision sighting device according to claim 1, wherein the night-vision sighting device further comprises a wireless transmission device wirelessly connected to an external device and transmits signals wirelessly from the night-vision sighting device to the external device to be displayed on a display unit of the external device.

20. The infrared-light and low-light two-phase fusion night-vision sighting device according to claim 1, wherein the control circuit comprises an interface board and a core board, the control unit is disposed on the core board, a field-of-view drive circuit of the field-of-view obtaining unit, a range-finding control circuit in a range-finding unit, and an output end of the two-phase fusion unit are all connected to the core board through the interface board, a display driving circuit of the display unit are connected to the core board.

21. The infrared-light and low-light two-phase fusion night-vision sighting device according to claim 20, wherein the core board has a memory card connected thereto, the memory card stores a bullet information database that contains an external ballistic 6-degree-of-freedom rigidity model, and a trajectory ballistic model.

22. The infrared-light and low-light two-phase fusion night-vision sighting device according to claim 21, wherein the external ballistic 6-degree-of-freedom rigidity model is adapted to receive one or more parameters selected from the group consisting of wind speed, wind direction, temperature, air pressure, humidity, longitude, latitude, and an elevation coordinate of a shooting point, initial velocity and direction of a bullet at a gun barrel outlet, a distance to the target obtained through the range-finding unit, mass of the bullet, cross-section area of the bullet, mass eccentricity of the bullet, rotational inertia of the bullet, and resistance coefficient of the bullet.

23. The infrared-light and low-light two-phase fusion night-vision sighting device according to claim 22, wherein, in the trajectory ballistic model, under a weather condition, air density function is 1, sound velocity is a constant, and a resistance coefficient is a function of bullet speed.

* * * * *